US012630190B2

(12) United States Patent
Collin et al.

(10) Patent No.: US 12,630,190 B2
(45) Date of Patent: May 19, 2026

(54) DISCERNING FAULT FOR RULE VIOLATIONS OF AUTONOMOUS VEHICLES FOR DATA PROCESSING

(71) Applicant: Motional AD LLC, Boston, MA (US)

(72) Inventors: Anne Collin, Cambridge, MA (US); Radboud Duintjer Tebbens, Winchester, MA (US); Amitai Bin-Nun, Silver Spring, MD (US); Cristhian Guillermo Lizarazo Jimenez, Boston, MA (US); Calin Belta, Sherborn, MA (US); Noushin Mehdipour, Allston, MA (US); Nathan Otenti, Somerville, MA (US)

(73) Assignee: Motional AD LLC, Boston, MA (US)

( * ) Notice: Subject to any disclaimer, the term of this patent is extended or adjusted under 35 U.S.C. 154(b) by 399 days.

(21) Appl. No.: 17/721,643

(22) Filed: Apr. 15, 2022

(65) Prior Publication Data

US 2023/0331256 A1     Oct. 19, 2023

(51) Int. Cl.
*B60W 60/00* (2020.01)
*B60W 40/09* (2012.01)
*G08G 1/01* (2006.01)

(52) U.S. Cl.
CPC ........ *B60W 60/0016* (2020.02); *B60W 40/09* (2013.01); *B60W 60/0017* (2020.02); *G08G 1/0133* (2013.01); *B60W 2540/30* (2013.01); *B60W 2554/4049* (2020.02)

(58) Field of Classification Search
CPC ..................... B60W 60/0016; B60W 60/0027
See application file for complete search history.

(56) References Cited

U.S. PATENT DOCUMENTS 9,645,577 B1    5/2017  Frazzoli et al.
10,235,882 B1 *  3/2019  Aoude ................... G08G 1/005
11,158,002 B1   10/2021  Brandmaier et al.
(Continued)

FOREIGN PATENT DOCUMENTS

JP          5252001 B2    7/2013
WO     WO 2021020311 A1   2/2021

OTHER PUBLICATIONS

International Preliminary Report on Patentability in International Appln. No. PCT/US2023/018732, mailed on Oct. 24, 2024, 10 pages.

(Continued)

*Primary Examiner* — Jess Whittington
(74) *Attorney, Agent, or Firm* — Fish & Richardson P.C.

(57) ABSTRACT

A rule violation leading to a traffic conflict involving a vehicle and at least one agent in real-time driving scenarios, simulation, re-simulation or other application is determined to be the fault of the vehicle by determining whether the situation was "reasonably foreseeable," determining whether the at least one agent is a vulnerable road user (VRU) and determining whether the at least one agent violated a higher priority rule than the rule violated by the vehicle. In an embodiment, on-vehicle decisions are based on a rulebook with a priority structure that accounts for responsibility and determines an "initiator" of the traffic conflict based on whether the vehicle or the at least one agent was the first to violate a rule and the first to violate a higher priority rule.

7 Claims, 6 Drawing Sheets

(56) References Cited

U.S. PATENT DOCUMENTS

| | | | |
|---|---|---|---|
| 11,767,030 | B1 | 9/2023 | Bagschik et al. |
| 11,830,357 | B1* | 11/2023 | Murphy ........... G08G 1/096716 |
| 11,940,793 | B1* | 3/2024 | Kavalar ................ B60W 60/00 |
| 2009/0326751 | A1 | 12/2009 | Otake et al. |
| 2017/0277194 | A1 | 9/2017 | Frazzoli et al. |
| 2018/0357409 | A1 | 12/2018 | Jantz et al. |
| 2019/0100216 | A1 | 4/2019 | Volos et al. |
| 2019/0145860 | A1 | 5/2019 | Phillips et al. |
| 2019/0202476 | A1* | 7/2019 | Tao ..................... B60W 30/095 |
| 2019/0206236 | A1* | 7/2019 | Tao ........................... G08G 1/08 |
| 2019/0206255 | A1* | 7/2019 | Tao ........................ G08G 1/164 |
| 2019/0213103 | A1 | 7/2019 | Morley et al. |
| 2019/0291728 | A1* | 9/2019 | Shalev-Shwartz ........................... B60W 30/0956 |
| 2019/0295179 | A1* | 9/2019 | Shalev-Shwartz ........................... B60W 30/18163 |
| 2020/0019174 | A1* | 1/2020 | Cheriton .............. G05D 1/0214 |
| 2020/0189575 | A1* | 6/2020 | Wongpiromsarn ......................... B60W 60/0015 |
| 2020/0192391 | A1* | 6/2020 | Vora ..................... G05D 1/0088 |
| 2020/0286309 | A1* | 9/2020 | Chellapilla ............ G08G 1/207 |
| 2020/0385024 | A1* | 12/2020 | Wongpiromsarn ......................... B60W 30/18159 |
| 2021/0065551 | A1* | 3/2021 | Manohar ................ G08G 1/167 |
| 2021/0094540 | A1* | 4/2021 | Bagschik ............... G06V 20/58 |
| 2021/0096571 | A1* | 4/2021 | Modalavalasa ...... G07C 5/0816 |
| 2021/0097148 | A1* | 4/2021 | Bagschik ................ G06F 30/15 |
| 2021/0110484 | A1* | 4/2021 | Shalev-Shwartz ... G05D 1/0088 |
| 2021/0303877 | A1 | 9/2021 | Jain et al. |
| 2021/0403034 | A1* | 12/2021 | Lapin ............... B60W 60/0027 |
| 2022/0080962 | A1 | 3/2022 | Bin-Nun et al. |
| 2022/0080975 | A1* | 3/2022 | Drollinger ........ B60W 60/0015 |
| 2022/0227367 | A1* | 7/2022 | Kario ................... G06V 40/103 |
| 2022/0289238 | A1* | 9/2022 | Wang ............... B60W 60/0017 |
| 2023/0171142 | A1* | 6/2023 | Kassas ................ H04L 27/2662 370/208 |
| 2023/0182754 | A1 | 6/2023 | Dong et al. |
| 2023/0286536 | A1* | 9/2023 | Belman .............. G01C 21/3415 |
| 2023/0303052 | A1* | 9/2023 | Gesang ................. B60W 30/18 |
| 2023/0356750 | A1 | 11/2023 | Nun et al. |
| 2023/0394896 | A1 | 12/2023 | Nica et al. |
| 2023/0401911 | A1 | 12/2023 | Zhu et al. |
| 2024/0134386 | A1 | 4/2024 | Nag |

OTHER PUBLICATIONS

[No Author Listed], "IEEE Standard for Assumptions in Safety-Related Models for Automated Driving Systems," IEEE Std 2846-2022, Apr. 2022, 59 pages.

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

International Search Report and Written Opinion in International Appln. No. PCT/US2023/018732, dated Sep. 5, 2023, 14 pages.

Invitation to Pay Additional Fees in International Appln. No. PCT/US2023/018732, dated Jul. 6, 2023, 3 pages.

Quante et al., "Human Performance in Critical Scenarios as a Benchmark for Highly Automated Vehicles," Automotive Innovation, Jul. 2021, 10 pages.

Smadi et al., "Naturalistic Driving Study: Development of the Roadway Information Database," Transportation Research Board, The Second Strategic Highway Research Program (SHRP-2) Report S2-S04A-RW-1, 2015, 120 pages.

Trustworthy AI Team, "Keeping score: Evaluating safety metrics for autonomous vehicles," Blog, May 7, 2021, retrieved Sep. 5, 2023, retrieved from URL <https://trustworthy.ai/2021/05/07/keeping-score.html>, 13 pages.

Partial Supplementary European Search Report in European Appln. No. 23789037.1, mailed on Oct. 28, 2025, 18 pages.

Weast, "P2846-D6 Jul. 19, 2021: P2846/D6, Draft Standard for Assumptions for Models in Safety-Related Automated Vehicle Behavior," VT/ITS/AV Decision Making Work Group of the IEEE Vehicular Technology Society, Jul. 19, 2021, pp. 1-74.

Xiao et al., "Rule-based Optimal Control for Autonomous Driving," CoRR, Submitted on Jan. 14, 2021, arXiv:2101.05709v1, 13 pages.

Xiao et al., "Rule-based optimal control for autonomous driving," Proceedings of the 14th ACM Conference on Security and Privacy in Wireless and Mobile Networks, ACMPUB27, May 19, 2021, pp. 143-154.

* cited by examiner

300

400

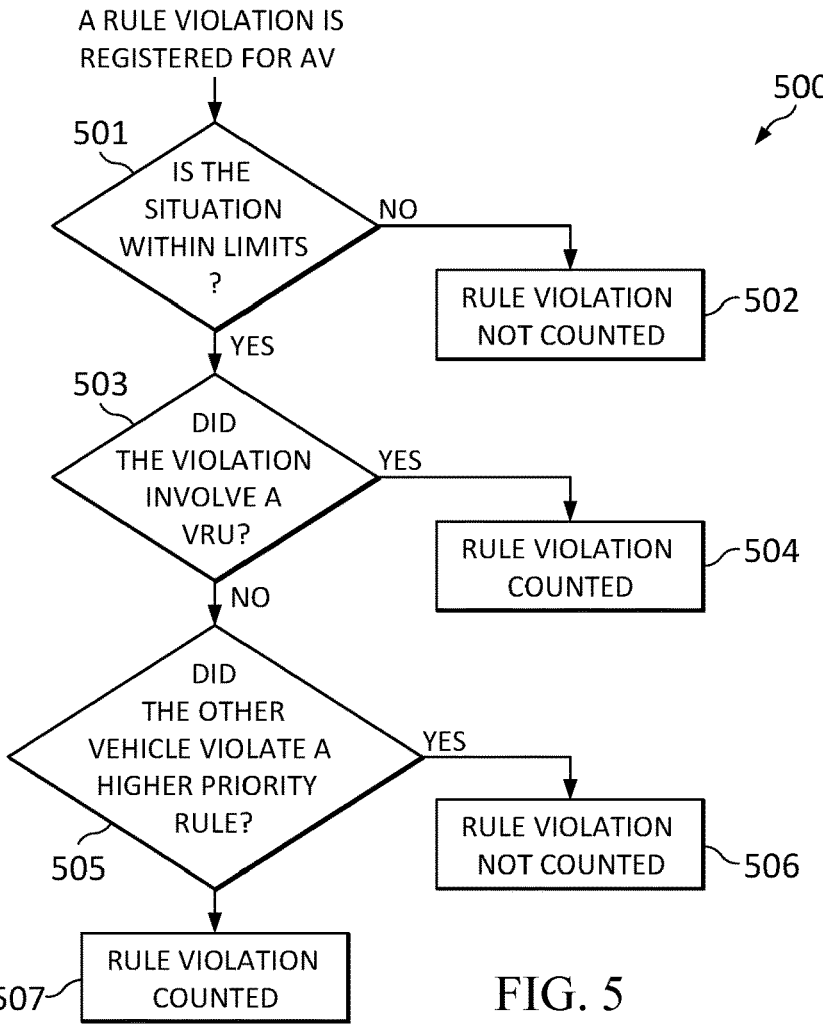

A RULE VIOLATION IS REGISTERED FOR AV

501 — IS THE SITUATION WITHIN LIMITS?

NO → RULE VIOLATION NOT COUNTED — 502

YES

503 — DID THE VIOLATION INVOLVE A VRU?

YES → RULE VIOLATION COUNTED — 504

NO

DID THE OTHER VEHICLE VIOLATE A HIGHER PRIORITY RULE? — 505

YES → RULE VIOLATION NOT COUNTED — 506

507 — RULE VIOLATION COUNTED

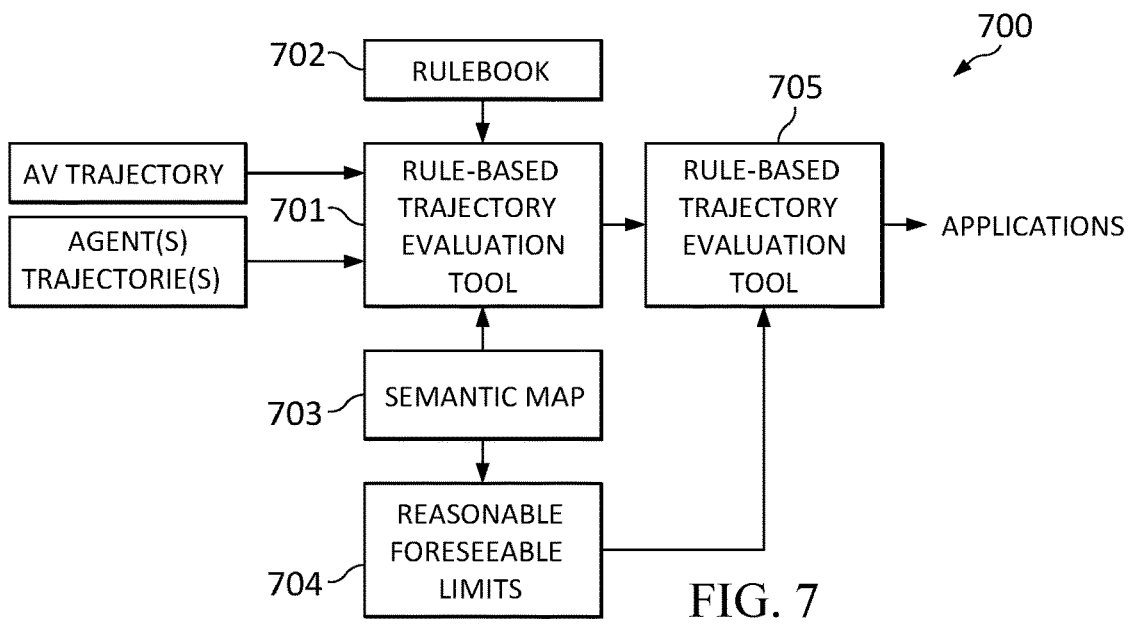

700

702 — RULEBOOK

AV TRAJECTORY

AGENT(S) TRAJECTORIE(S)

701 — RULE-BASED TRAJECTORY EVALUATION TOOL

705 — RULE-BASED TRAJECTORY EVALUATION TOOL → APPLICATIONS

703 — SEMANTIC MAP

704 — REASONABLE FORESEEABLE LIMITS

FIG. 7

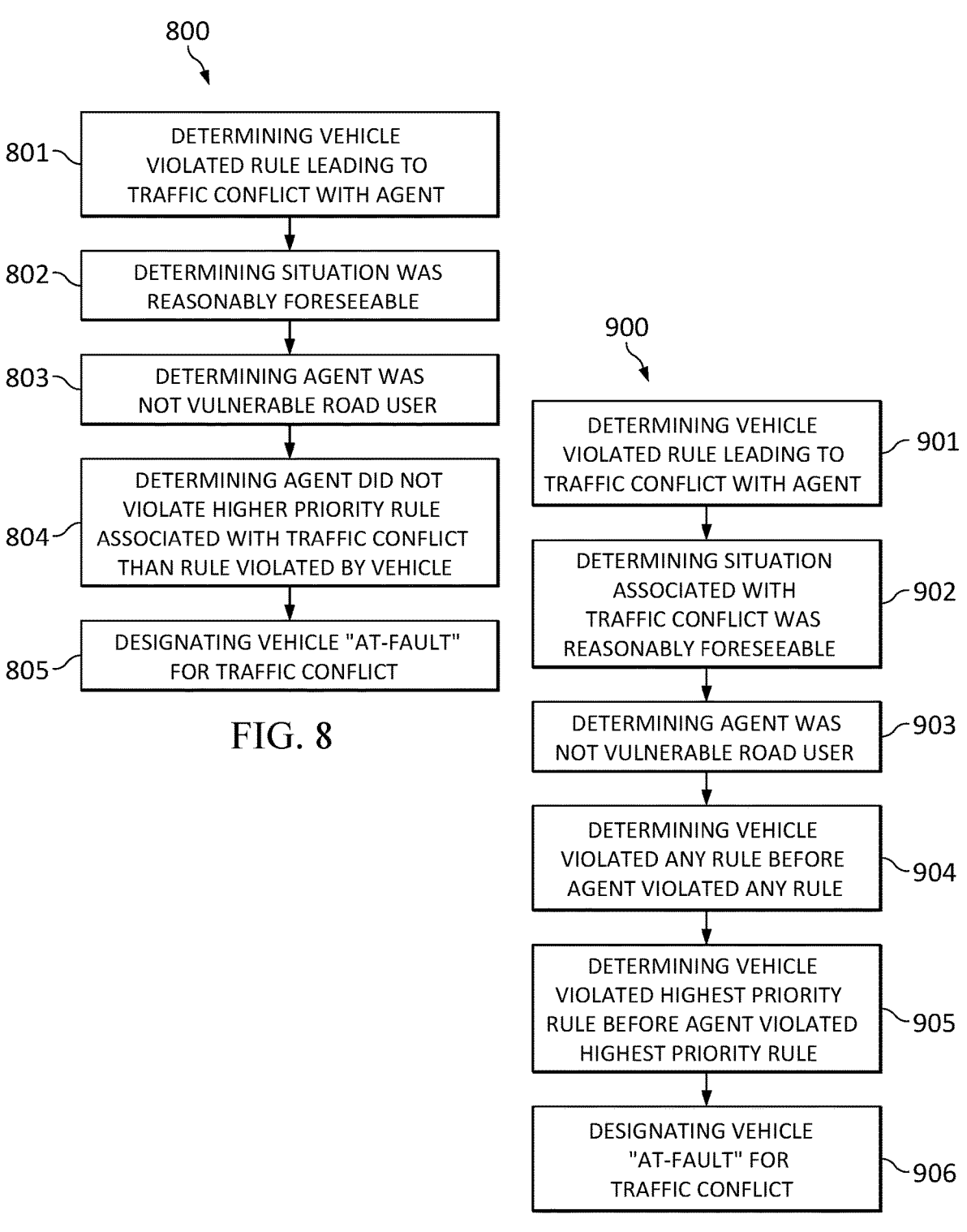

800

801 — DETERMINING VEHICLE VIOLATED RULE LEADING TO TRAFFIC CONFLICT WITH AGENT

802 — DETERMINING SITUATION WAS REASONABLY FORESEEABLE

803 — DETERMINING AGENT WAS NOT VULNERABLE ROAD USER

804 — DETERMINING AGENT DID NOT VIOLATE HIGHER PRIORITY RULE ASSOCIATED WITH TRAFFIC CONFLICT THAN RULE VIOLATED BY VEHICLE

805 — DESIGNATING VEHICLE "AT-FAULT" FOR TRAFFIC CONFLICT

DETERMINING VEHICLE VIOLATED RULE LEADING TO TRAFFIC CONFLICT WITH AGENT — 901

DETERMINING SITUATION ASSOCIATED WITH TRAFFIC CONFLICT WAS REASONABLY FORESEEABLE — 902

DETERMINING AGENT WAS NOT VULNERABLE ROAD USER — 903

DETERMINING VEHICLE VIOLATED ANY RULE BEFORE AGENT VIOLATED ANY RULE — 904

DETERMINING VEHICLE VIOLATED HIGHEST PRIORITY RULE BEFORE AGENT VIOLATED HIGHEST PRIORITY RULE — 905

DESIGNATING VEHICLE "AT-FAULT" FOR TRAFFIC CONFLICT — 906

FIG. 9

DISCERNING FAULT FOR RULE VIOLATIONS OF AUTONOMOUS VEHICLES FOR DATA PROCESSING

BACKGROUND

Planning systems for autonomous vehicles (AVs) can use policies or rulebooks in determining multiple feasible trajectories through an environment. Whether in real life or in simulation, many rule violations by the AV may be registered. Some of those rule violations reflect poor behavior choices of the AV. Other rule violations, however, are due to the particular situation or the behavior of other agents. For example, other agents in a simulation may not be responsive to the actions of the AV and therefore the rule violation is not the fault of the AV. The lack of distinction between these two situations in real life and in simulation slows down the AV development process by directing engineering resources to solve what appears to be an AV behavioral problem, but is in fact a problem with the behavior of other agents.

Testing an AV in simulation is a way to test AV operation in complex scenarios such as scenarios involving corner cases not often encountered in the real world. In some of these complex scenarios, simulated agents (e.g., simulated pedestrians, simulated vehicles, and/or the like) may be configured (intentionally or unintentionally) to interact with the simulated AV and cause the simulated AV to generate trajectories that violate rules or policies. It some instances it can be difficult to identify when the simulated agent is causing the generation of these trajectories, making it difficult to update the software operating the simulated AV and improve the trajectories generated by the simulated AV.

BRIEF DESCRIPTION OF THE FIGURES

FIG. 5 is a flow diagram of a process for determining whether an AV is at-fault for a traffic conflict because of a rule violation;

FIG. 7 is a block diagram of a planning system capable of discerning whether or not an AV is at fault for rule violations leading to a traffic conflict;

FIG. 8 is a flow diagram of a process for discerning fault between a vehicle and agent that have violated rules leading to a traffic conflict; and FIG. 9 is a flow diagram of a process for discerning the initiator of a traffic conflict involving an AV and an agent.

DETAILED DESCRIPTION

Figure 1:
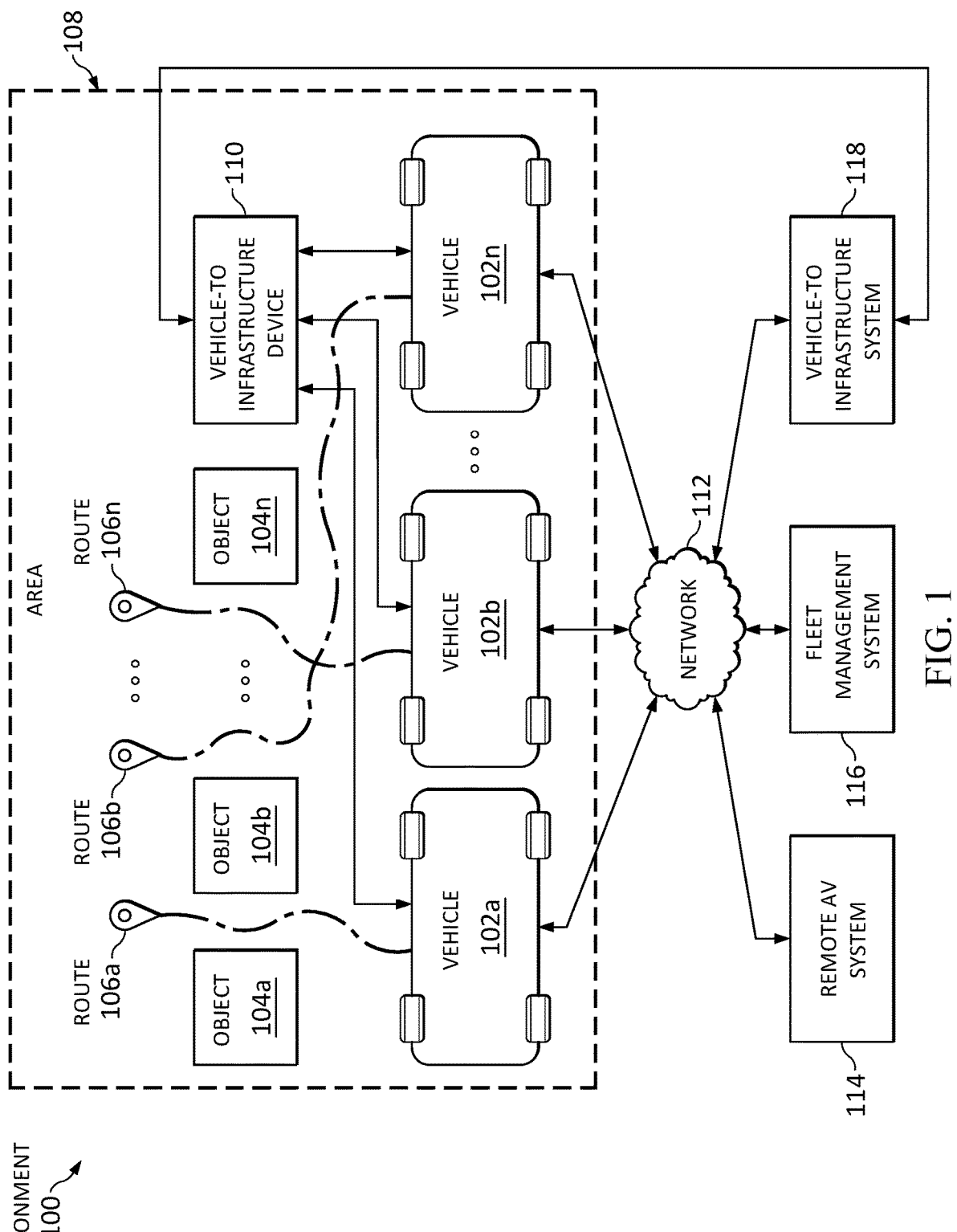
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement technology for discerning fault for rule violations by AVs for use in data processing and other applications.

Agents used in simulation tools typically follow a predefined path, and thus may not react to decisions made by the simulated AV. This can lead to a high number of traffic conflicts in simulation which are not the fault of the AV. A traffic conflict is any potential accident situation, including but not limited to: evasive actions taken by AVs (e.g., braking, weaving) and traffic violations (e.g., running a red light). A rule formulation for traffic conflicts may not take into account responsibility of the agents in an environment during a traffic conflict, resulting in AV behavior being penalized for any traffic conflict with an agent, even if the traffic conflict was initiated by the agent. This issue becomes problematic during simulation/testing of the AV to establish whether the behavior of the AV was acceptable.

In an embodiment, determining whether a rule violation leading to a traffic conflict is the fault of the AV or agent includes three steps. First, the simulation tool determines if the situation was "reasonably foreseeable," which can be defined by an applicable standard, such as the IEEE P2846 standard. Any desired standard or process can be used, provided the standard or process places limits on the behaviors of agents around the AV to give a clear line of what an AV should be able to handle in a given situation. If the situation is not reasonably foreseeable, the rule violation should not be counted as "at-fault" against the AV.

Second, the simulation tool determines if the rule violation by the AV involves a Vulnerable Road User (VRU), which is a specific category of agents (e.g., pedestrians, bicyclists), and whether the behavior of the VRU was reasonably foreseeable. If the rule violation by the AV is a part of an interaction with a VRU and the behavior of the VRU was not reasonably foreseeable, then a rule violation by the AV should not be counted against the AV.

Third, the simulation tool determines if a non-VRU agent violated a rule by applying at least one rulebook (e.g., the same rulebook as applied to the AV) to other agents (e.g., to the actions or motions taken by other agents) to check whether the non-VRU agents violated a rule as part of their respective interaction with the AV. If the agent violated a rule that is higher in priority than the rule violated by the AV (except for the case when both the AV and agent would have violated the highest level rule and/or a predefined, inviolable rule), then the rule violation of the AV is not counted as at-fault against the AV.

Priority in this context refers to the importance of a rule compared to other rules in a rulebook priority structure. In certain instances, lower priority rules can be violated to avoid violating higher priority rules. For example, if a first rule has a higher priority than a second rule, then this rulebook priority structure implies that a trajectory that violates the second rule but not the first rule is preferable to any trajectory that violates the first rule.

In an embodiment, fault-aware, on-vehicle decisions can be made according to the priorities of the at-fault and not-at-fault traffic conflicts in a rulebook priority structure that takes into account responsibility for the traffic conflict. For example, to determine an initiator of a traffic conflict involving the AV and at least one agent, the traffic conflict is classified by cataloging the rules violated by both the AV and the (at least one) agent leading up to the traffic conflict. In some rulebook formulations, it is unlikely to have a traffic conflict without at least one vehicle violating at least one rule. It is more likely, however, that each vehicle might violate more than one rule.

After determining which vehicle was the first to violate any rule leading to the traffic conflict, the process determines which vehicle was the first to violate the most important rule (relative to other rules violated) leading to the traffic conflict. In a case when both vehicles violate at least one rule, the process determines which vehicle was the first to violate the highest priority rule leading to the traffic conflict. In a scenario of a leading vehicle braking in front of a lag vehicle, the lag vehicle violates a more important rule to maintain front clearance. Thus, in this scenario the lag vehicle is considered the initiator of the traffic conflict.

In an embodiment, a method comprises: determining, with at least one processor, that a vehicle violated at least one rule leading up to a traffic conflict involving at least one agent; determining, with the at least one processor, that the behavior of the at least one agent was reasonably foreseeable; determining, with the at least one processor, that the at least one agent was not a vulnerable road user; determining, with the at least one processor, that the at least one agent did not violate a higher priority rule leading up to the traffic conflict than the at least one rule violated by the vehicle; and designating, with the at least one processor, the vehicle as being at-fault for the traffic conflict.

In an embodiment, the method further comprises: incrementing, with the at least one processor, a count of traffic conflicts that are determined to be the fault of the vehicle; and comparing the count to a statistical safety target to evaluate whether the vehicle maintains a positive risk balance compared to average human drivers.

In an embodiment, evaluating whether the vehicle maintains a positive risk balance compared to average human drivers further comprises: determining a rate of traffic conflicts caused by the vehicle; and determining that the rate is below an average rate of traffic conflicts caused by human drivers.

In an embodiment, the rate of traffic conflicts caused by the vehicle is determined based on at least one of a number of actual traffic conflicts or traffic conflict-preventing human takeovers of the vehicle per a specified distance driven by the vehicle.

In an embodiment, determining, with the at least one processor, that the at least one agent did not violate a higher priority rule leading up to the traffic conflict than the at least one rule violated by the vehicle, further comprises: evaluating a rulebook priority structure that accounts for responsibility to determine that the at least one agent did not violate a higher priority rule leading up to the traffic conflict than the at least one rule violated by the vehicle.

In an embodiment, a method comprises: determining, with at least one processor, a first trajectory for a vehicle in an environment; determining, with the at least one processor, a second trajectory for the vehicle in the environment; evaluating, with the at least one processor, the first and second trajectories using the set of rules, the evaluating comprising: determining, with the at least one processor, that the vehicle would violate a first rule in the set of rules based on the first trajectory, and the violation of the first rule would lead to a traffic conflict with at least one agent in the environment; determining, with the at least one processor, that the vehicle would violate the first rule in the set of rules based on the second trajectory, and the violation of the first rule would lead to the traffic conflict with the at least one agent in the environment; determining, with the at least one processor, that the at least one agent would violate a second rule in the set of rules based on the first trajectory, and the violation of the second rule would lead to the traffic conflict with the vehicle in the environment; determining, with the at least one processor, that the at least one agent would violate a third rule in the set of rules based on the second trajectory, and the violation of the third rule would lead to the traffic conflict with the vehicle in the environment; determining, with the at least one processor, that the second rule has a lower priority than the first rule and the third rule has a higher priority than the first rule; and causing, with a control circuit of the vehicle, the vehicle to travel the first trajectory.

In an embodiment, a system comprises: at least one processor; memory storing instructions that when executed by the at least one processor, cause the at least one processor to perform any of the preceding method claims.

In an embodiment, a method comprises: determining, with at least one processor, a first set of rules violated by a vehicle leading up to a traffic conflict; determining, with the at least one processor, a second set of rules violated by at least one agent leading up to the traffic conflict; determining, with the at least one processor, which of the vehicle or agent is at fault in relation to the traffic conflict by: determining, with the at least one processor, which of the vehicle or the at least one agent was the first to violate any rule in their respective set of rules leading up to the traffic conflict; determining, with the at least one processor, which of the vehicle or the at least one agent was the first to violate a highest priority rule in their respective set of rules leading up to the traffic conflict, where the highest priority rule is a rule that cannot be violated before any other rule in the set of rules is violated; and determining, with the at least one processor, which of the vehicle or agent is at fault in relation to the traffic conflict based on whether the vehicle or the at least one agent was the first to violate a rule in their respective set of rules, and whether the vehicle or the at least one agent was the first to violate their respective highest priority rule in their respective sets of rules leading up to the traffic conflict.

In an embodiment, at least one rule in the first or second sets of rules is designated as indicative of a traffic conflict if the at least one rule is violated.

In an embodiment, a frequency of violation of the at least one rule designated as indicative of a traffic conflict if the at least one rule is violated, is tracked as a performance metric for evaluating safety performance for the first or second vehicle.

By virtue of the implementation of systems, methods, and computer program products described herein, techniques for discerning fault for rule violations by AVs provide at least the following advantages.

Engineering analysis of AV behavior can be avoided and engineering resources can be deployed on other development tasks by determining that a rule violation is due to agent behavior and not AV behavior.

AV stack development is improved by filtering out situations in which the AV was not-at-fault during simulation of the AV. Simulation of the AV is also improved by directly encoding the limits of other agents' behavior to only create reasonably foreseeable situations.

Public road mileage accumulation for statistical validation is improved by not needlessly restarting a large validation effort due to a not-at-fault traffic conflict.

Evaluation of on-vehicle decisions is improved by avoiding needlessly changing on-vehicle decision making algorithms due to a not-at-fault traffic conflict.

A methodology is provided for making a behavioral specification for an AV fault-sensitive (e.g., establish some relative prioritization between at-fault and not-at-fault traffic conflicts).

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote AV system 114, fleet management system 116, and V2I system 118. Vehicles 102a-102n, vehicle-to-infrastructure (V2I) device 110, network 112, AV system 114, fleet management system 116, and V2I system 118 interconnects (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, AV system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
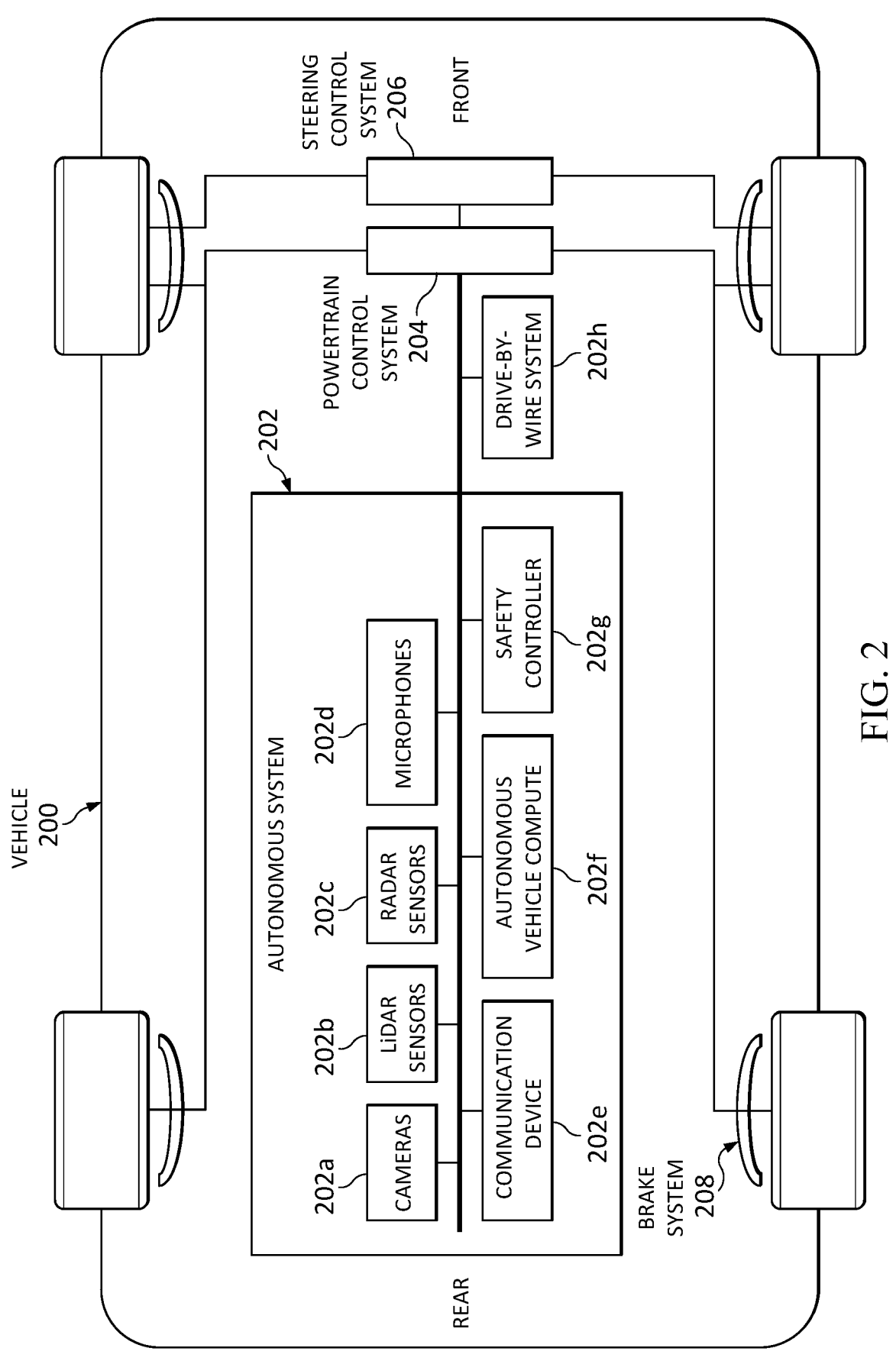
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
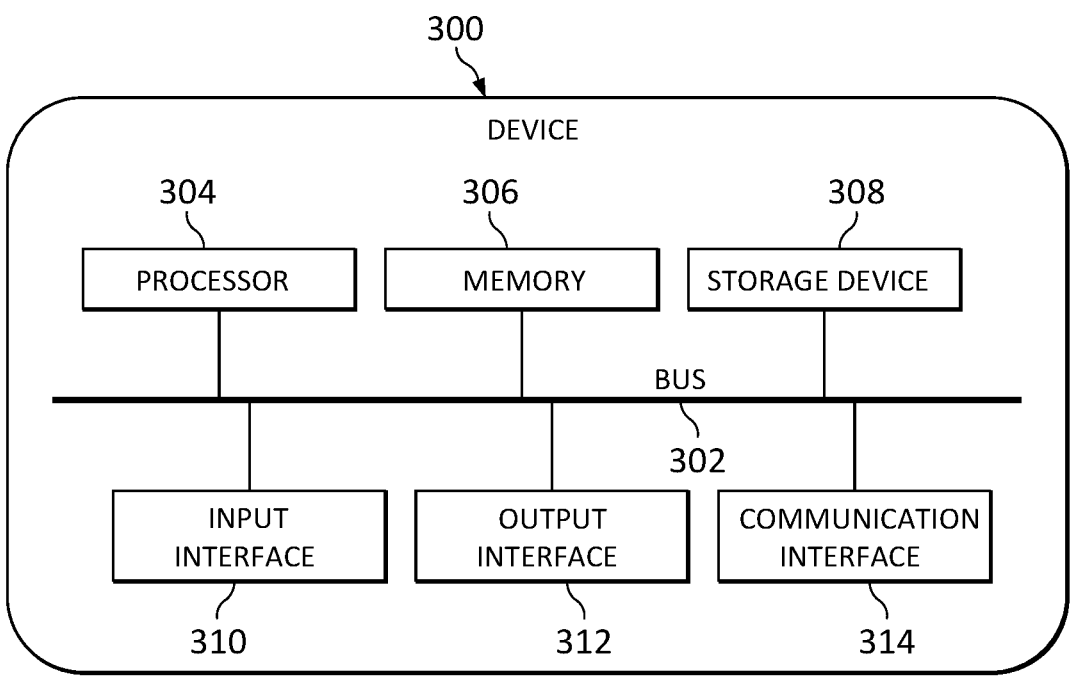
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* include at least one device configured to be in communication with cameras 202*a*, LiDAR sensors 202*b*, radar sensors 202*c*, microphones 202*d*, autonomous vehicle compute 202*f*, safety controller 202*g*, and/or DBW system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes computer processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of, and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, computer processor 304, memory 306, storage component 308, input interface 310, output interface 312, and communication interface 314.

Bus 302 includes a component that permits communication among the components of device 300. In some embodiments, computer processor 304 is implemented in hardware, software, or a combination of hardware and software. In some examples, computer processor 304 includes a computer processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by computer processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on computer processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause computer processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by computer processor 304 and/or by a computer processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4:
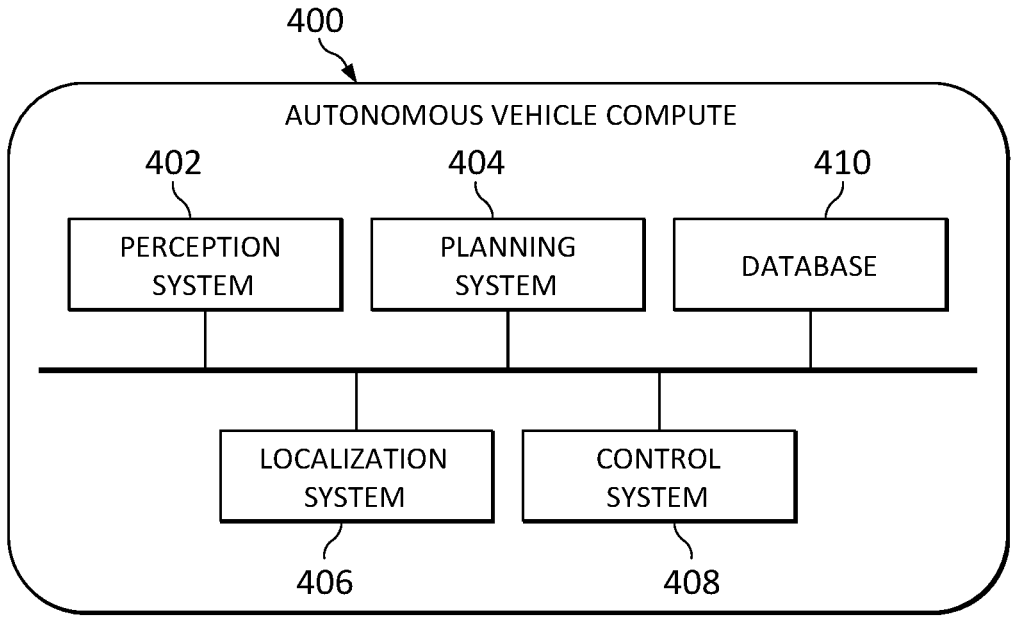
FIG. 4 is a diagram of certain components of an autonomous system.

Referring now to FIG. 4, illustrates is an example block diagram of an AV compute 400 (sometimes referred to as an "AV stack"). As illustrated, AV compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of AV compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LIDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

FIG. 5 is a flow diagram of a process 500 of determining whether an AV is at-fault for a rule violation. In some embodiments, process 500 is implemented performed (e.g., completely, partially, etc.) using a planning system that is the same as or similar to planning system 404, described in reference to FIG. 4. In some embodiments, one or more of the steps of process 500 are performed (e.g., completely, partially, and/or the like) by another device or system, or another group of devices and/or systems that are separate from, or include, the planning system. For example, one or more steps of process 500 can be performed (e.g., completely, partially, and/or the like) by remote AV system 114, vehicle 200 (e.g., autonomous system 202 of vehicle 200), and/or AV compute 400 (e.g., one or more systems of AV compute 400). In some embodiments, the steps of process

500 may be performed between any of the above-noted systems in cooperation with one another.

Process 500 begins by determining if a rule violation has been registered for the AV (501). For example, a planning system (e.g., a planning system that is the same as or similar to planning system 404 and 700) generates trajectory proposals for an AV based on a dynamic world model (e.g., models the AV, agents, road conditions, traffic, etc.). The planning system scores the trajectory proposals using one or more rulebooks associated with (e.g., defining) a priority structure, such as the rulebook priority structure illustrated in FIG. 6 that accounts for responsibility for rule violations. The rules can be specified using logical expressions that, if satisfied or not satisfied, result in a rule violation. For example, a speed limit or lateral clearance rule could be violated by an AV by exceeding a posted speed limit or not maintaining a specified clearance distance from an agent, respectively.

Process 500 continues by determining if the situation where the rule was violated was reasonably foreseeable (501). In embodiments, the planning system described above determines if the situation where the rule was violated was reasonably foreseeable. Whether a rule was reasonably foreseeable can be defined by the publicly available IEEE P2846 standard titled, "Assumptions for Models in Safety-Related Automated Vehicle Behavior." IEEE P2846 describes the minimum set of reasonable assumptions used in foreseeable scenarios to be considered for road vehicles in the development of safety-related models that are part of automated driving systems (ADS). The standard includes consideration of rules of the road and their regional and/or temporal dependencies. Thus, IEEE P2846 places limits on the behaviors of agents around the AV to give a clear line of what the AV should be able to handle in a given situation. IEEE P2846 defines "reasonably foreseeable" as technically feasible and with a credible or measurable rate of occurrence. As used herein, AV or agent "behavior" is how the AV or agent reacts to other agents, static or dynamic objects and the operating environment of the AV or agent, including but not limited to: road conditions, traffic conditions, weather conditions, emergency scenarios, etc.

If the rule violation is not reasonably foreseeable, the planning system does not count the rule violation against the AV (502) or subject to further review in certain contexts (e.g., statistical validation of AV safety). If the rule violation is reasonably foreseeable, process 500 continues with the planning system determining if the rule violation involved a vulnerable road user (VRU) (503). Because VRUs are a specific category of agents, if the behavior was reasonably foreseeable, the rule violation by the AV should be counted against the AV no matter whether the VRU violated a rule or not. An example VRU would be a pedestrian or bicyclist. If the rule violation involved a VRU, the rule violation is counted against the AV (504).

Figure 6:
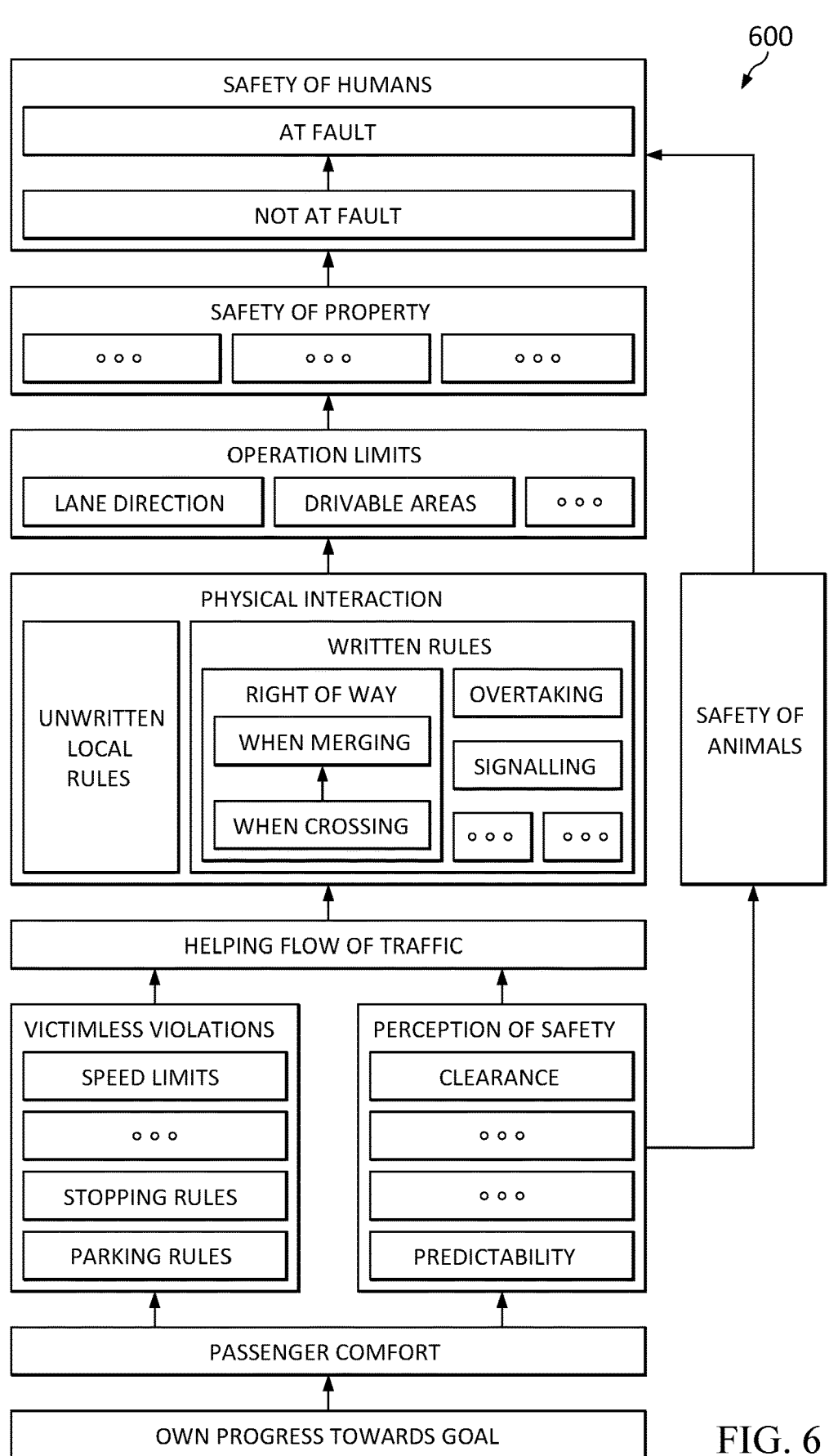
FIG. 6 illustrates a rulebook priority structure for AV route planning that takes into account responsibility for rule violations.

If the rule violation did not involve a VRU, process 500 determines whether the non-VRU agent violated a higher priority rule than the AV violated based on a rulebook that accounts for responsibility (505), such as the rulebook shown in FIG. 6. If the agent violated a higher priority rule, then the rule violation is not counted against the AV (506). If the non-VRU agent violated a lower priority rule than violated by the AV, the rule violation counts against the AV (507).

Rulebooks are applied to agents to check whether they violated a rule as part of an interaction with the AV. If the rule violated by the agent is higher in a rulebook than the rule violated by the AV, then the AV's rule violation should not be counted against the AV. If the rules violated by both the AV and agent involve a rule at the same priority level or in the same priority group (e.g., both violated a safety-rules at the highest priority level), then the rule violation is counted against the AV, even though fault for the traffic conflict is shared between the AV and agent.

Process 500 described above can be further explained through examples. In a first example, an agent (e.g., another vehicle) in a simulation runs a red traffic light at an intersection and comes into contact with the AV, which was proceeding through a green traffic light. In this example, the traffic conflict may not be counted against the AV because the agent violated a traffic law while the AV did not violate a traffic law.

Process 500 described above provides several advantages and benefits, including but not limited to: speeding up engineering development of an AV stack and improving on-vehicle decision making. In an embodiment, process 500 can be added as a performance metric to a dashboard in an AV behavior evaluation application based on a rulebook to help separate the difficulty of the operational design domain from the actual performance of the AV.

In embodiments, a count is maintained of traffic conflicts that are determined to be the fault of the vehicle based on designating the vehicle as being at-fault for the traffic conflict. The count can then be compared to a statistical safety target to evaluate whether the vehicle maintains a positive risk balance associated with an average human driver. There is a positive risk balance, for example, if the AV meets a statistical safety target, which requires that the rate of unknown hazardous scenarios of the AV is below some number X times the average rate of human crashes in US urban areas with high confidence. In embodiments, actual collisions and or collision-preventing takeovers (CP-TOs) per mile driven can be used to measure the rate of unknown hazardous scenarios of the AV.

In embodiments, evaluating whether the vehicle maintains a positive risk balance compared to average human drivers can be achieved by determining a rate of traffic conflicts caused by the vehicle, and then determining that the rate is below an average rate of traffic conflicts associated with human drivers.

In embodiments, a frequency of violation of at least one rule is tracked as a performance metric for evaluating performance for the first or second vehicle.

FIG. 6 illustrates a rulebook priority structure 600 for AV route planning that takes into account responsibility for rule violations. While avoiding any traffic conflict regardless of fault may be preferred, being able to differentiate between at-fault and not-at-fault rule violations using rulebook priority structure 600 is desirable. In the example priority structure 600 shown, there are different priority groups of rules at different priority levels, where priority increases as one moves up the priority structure 600 with the priority group "safety of humans" being the highest priority group of rules.

In this example, the safety to humans priority group is designated as having at-fault and not-at-fault components. For example, a trajectory scoring algorithm performed by a planning system (e.g., planning system 404/700 shown in FIGS. 4 and 7) can run a trajectory proposal through the rulebook priority structure 600 shown in FIG. 6, and evaluate a degree, if any, in which the rules in each priority group have been violated by the trajectory. Based on the degree to which the rules in each priority group have been violated, the planning system determines whether the AV is at-fault.

In the priority structure 600, the lowest priority is progress towards goal, followed by passenger comfort, followed by victimless rule violations and perception of safety (e.g., maintaining clearance and predictability to make the rider feel safe), followed by helping flow of traffic, followed by physical interaction and safety of animals, followed by operation limits (e.g., lane direction, drivable areas), followed by safety of property, followed by safety of humans. When the safety of humans priority group is evaluated, process 500 described in reference to FIG. 5 is initiated to determine if the AV was at-fault.

For example, if an agent violated a speed limit in the victimless violation priority group of rulebook priority structure 600 and collided with an AV that merged in front of the agent without signaling, thereby violating a traffic rule in the physical interaction priority group, the AV would be at-fault for the traffic conflict. This is because the situation was reasonably foreseeable, it did not involve a VRU and the agent did not violate a higher priority rule than violated by the AV.

FIG. 7 is a block diagram of an example planning system 700 capable of discerning fault for a traffic conflict, according to an embodiment. Planning system 700 includes rule-based trajectory evaluation tool 701, rulebook 702, semantic map 703, reasonably foreseeable limits 704 and at-fault evaluator 705. Planning system 700 can be applied in various settings, including but not limited to: real-world driving, simulation testing, playback of real-world data (e.g., re-simulation) and improving public road mileage accumulation for statistical validation. In an embodiment, testing an AV in a setting produces logs that include but are not limited to: a trajectory (track) of the AV under test, trajectories (tracks) of other agents (e.g., other vehicles, VRUs). In an embodiment, the trajectories can be files (e.g., JSON files) of positions, velocities and accelerations over time recorded on a semantic map that has information about lane markings, signage, traffic lights (and status over time), etc.

Rule-based trajectory evaluation tool 701 implements the rules in rulebook 702 for each trajectory, and returns degrees of rule violations for each trajectory with respect to each rule. Rulebook 702 contains traffic laws and other driving rules organized in a priority structure that indicates the relative importance of each rule, for example, as shown in the example rulebook in FIG. 6. Reasonably foreseeable limits 704 are bounds on kinetic parameters (e.g., velocity, acceleration/deceleration) of agents (e.g., other vehicles, VRUs) based on, for example, IEEE P2846. At-fault evaluator 705 evaluates agent behavior leading up to the traffic conflict to determine whether the behavior was reasonably foreseeable, and/or whether the agent violated more important rules in rulebook 702 than the AV violated.

In an embodiment, rule-based trajectory evaluation tool 701 takes as inputs the AV trajectory and agent trajectories, rulebook 702 and semantic map 703, and generates degrees of rule violations for each trajectory. At-fault evaluator 705 takes as inputs the outputs of the rule-based trajectory evaluation tool 701 and reasonably foreseeable limits 704, and applies the at-fault logic shown in FIG. 5 to the inputs to determine which of the AV or the agent(s) are at-fault for the traffic conflict.

FIG. 8 is a flow diagram of a process 800 for discerning fault for data processing, on-vehicle decisions, validation and other applications. Process 800 can be performed by, for example, planning system 700 shown in FIG. 7.

Process 800 begins by determining that a vehicle (e.g., an AV that is the same as or similar to vehicle 102) violated at least one rule (e.g., stopping at a red light) leading to a traffic conflict with at least one agent (801) (e.g., another vehicle).

Process 800 continues by determining that the situation was reasonably foreseeable (802). For example, whether a rule was reasonably foreseeable can be determined based on comparing the situation to one or more rules specified by the publicly available IEEE P2846 standard that describes the minimum set of reasonable assumptions used in foreseeable scenarios to be considered for road vehicles in the development of safety-related models that are part of an ADS.

Process 800 continues by determining that the agent was not a VRU (803), and that the agent did not violate a higher priority rule leading up to the traffic conflict than the rule violated by the vehicle (804). For example, a rulebook with a priority structure (e.g., rulebook priority structure 600) that accounts for responsibility can be used to determine if the agent violated a higher priority rule.

Process 800 continues by designating the vehicle at-fault for the traffic conflict (805).

FIG. 9 is a flow diagram of a process for discerning the initiator of a traffic conflict involving an AV and an agent. Process 900 can be performed by, for example, processor 304 shown in FIG. 3.

Process 900 begins by determining that a vehicle violated a rule leading to a traffic conflict with at least one agent (901). Process 900 continues by determining that the situation associated with the traffic conflict was reasonably foreseeable (902). For example, whether a rule was reasonably foreseeable can be defined by the publicly available IEEE P2846 standard.

Process 900 continues by determining that the agent was not a VRU (903), determining that the vehicle violated any rule before the agent violated any rule (904), determining that the vehicle violated a highest priority rule before the agent violated a highest priority rule (905) and designating the vehicle as at-fault for the traffic conflict (906). For example, a rulebook having a priority structure that accounts for responsibility by assigning fault can be used to determine rule violations, as described in reference to FIG. 6.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/ sub-entity of a previously-recited step or entity.

What is claimed is:

1. A method comprising: determining, with at least one processor, a first trajectory of a vehicle; determining, with the at least one processor, a second trajectory of at least one agent; causing, with a controller of the vehicle, the vehicle to travel the first trajectory; causing, with the at least one processor, the at least one agent to travel the second trajectory; determining, with the at least one processor, a traffic conflict involving the vehicle and the at least one agent due to at least one of the first and second trajectories; determining, with at least one processor, that the vehicle violated at least one rule leading up to the traffic conflict involving the at least one agent; determining, with the at least one processor, that a behavior of the at least one agent was technically feasible and with a measurable rate of occurrence; determining, with the at least one processor, that the at least one agent was not a vulnerable road user; determining, with the at least one processor, that the at least one agent did not violate a higher priority rule leading up to the traffic conflict than the at least one rule violated by the vehicle; designating, with the at least one processor, the vehicle as being at-fault for the traffic conflict; and incrementing a count of traffic conflicts that are determined to be the fault of the vehicle based on designating the vehicle as being at-fault for the traffic conflict; and comparing the count to a statistical safety target to evaluate whether the vehicle maintains a positive risk balance associated with an average human driver.

2. The method of claim 1, wherein evaluating whether the vehicle maintains a positive risk balance compared to average human drivers further comprises: determining a rate of traffic conflicts caused by the vehicle; and determining that the rate is below an average rate of traffic conflicts associated with human drivers.

3. The method of claim 2, wherein the rate of traffic conflicts caused by the vehicle is determined based on at least one of a number of actual traffic conflicts or traffic conflict-preventing human takeovers of the vehicle per a specified distance driven by the vehicle.

4. A system comprising: at least one processor; a controller; memory storing instructions that when executed by the at least one processor, causes the at least one processor to perform operations comprising: determining a first trajectory of a vehicle; determining a second trajectory of at least one agent; causing, with the controller, the vehicle to travel the first trajectory; causing the at least one agent to travel the second trajectory; determining a traffic conflict involving the vehicle and the at least one agent due to at least one of the first and second trajectories; determining that the vehicle violated at least one rule leading up to the traffic conflict involving the at least one agent; determining that a behavior of the at least one agent was reasonably foreseeable; determining that the at least one agent was not a vulnerable road user; determining that the at least one agent did not violate a higher priority rule leading up to the traffic conflict than the at least one rule violated by the vehicle; designating vehicle as being at-fault for the traffic conflict; and incrementing a count of traffic conflicts that are determined to be the fault of the vehicle based on designating the vehicle as being at-fault for the traffic conflict; and comparing the count to a statistical safety target to evaluate whether the vehicle maintains a positive risk balance associated with an average human driver.

5. The system of claim 4, wherein evaluating whether the vehicle maintains a positive risk balance compared to average human drivers further comprises:

determining a rate of traffic conflicts caused by the vehicle; and determining that the rate is below an average rate of traffic conflicts associated with human drivers.

6. The system of claim 5, wherein the rate of traffic conflicts caused by the vehicle is determined based on at least one of a number of actual traffic conflicts or traffic conflict-preventing human takeovers of the vehicle per a specified distance driven by the vehicle.

7. A non-transitory, computer-readable storage medium having stored thereon instructions that when executed by at least one processor, causes the at least one processor to perform operations comprising: determining a first trajectory of a vehicle; determining a second trajectory of at least one agent; causing, with a controller of the vehicle, the vehicle to travel the first trajectory; causing the at least one agent to travel the second trajectory; determining a traffic conflict involving the vehicle and the at least one agent due 5 to at least one of the first and second trajectories; determining that the vehicle violated at least one rule leading up to the traffic conflict involving the at least one agent; determining that a behavior of the at least one agent was reasonably foreseeable; determining that the at least one 10 agent was not a vulnerable road user; determining that the at least one agent did not violate a higher priority rule leading up to the traffic conflict than the at least one rule violated by the vehicle; designating vehicle as being at-fault for the traffic conflict; and incrementing a count of traffic conflicts 15 that are determined to be the fault of the vehicle based on designating the vehicle as being at-fault for the traffic conflict; and comparing the count to a statistical safety target to evaluate whether the vehicle maintains a positive risk balance associated with an average human driver. 20

\*    \*    \*    \*    \*